Figure 1:
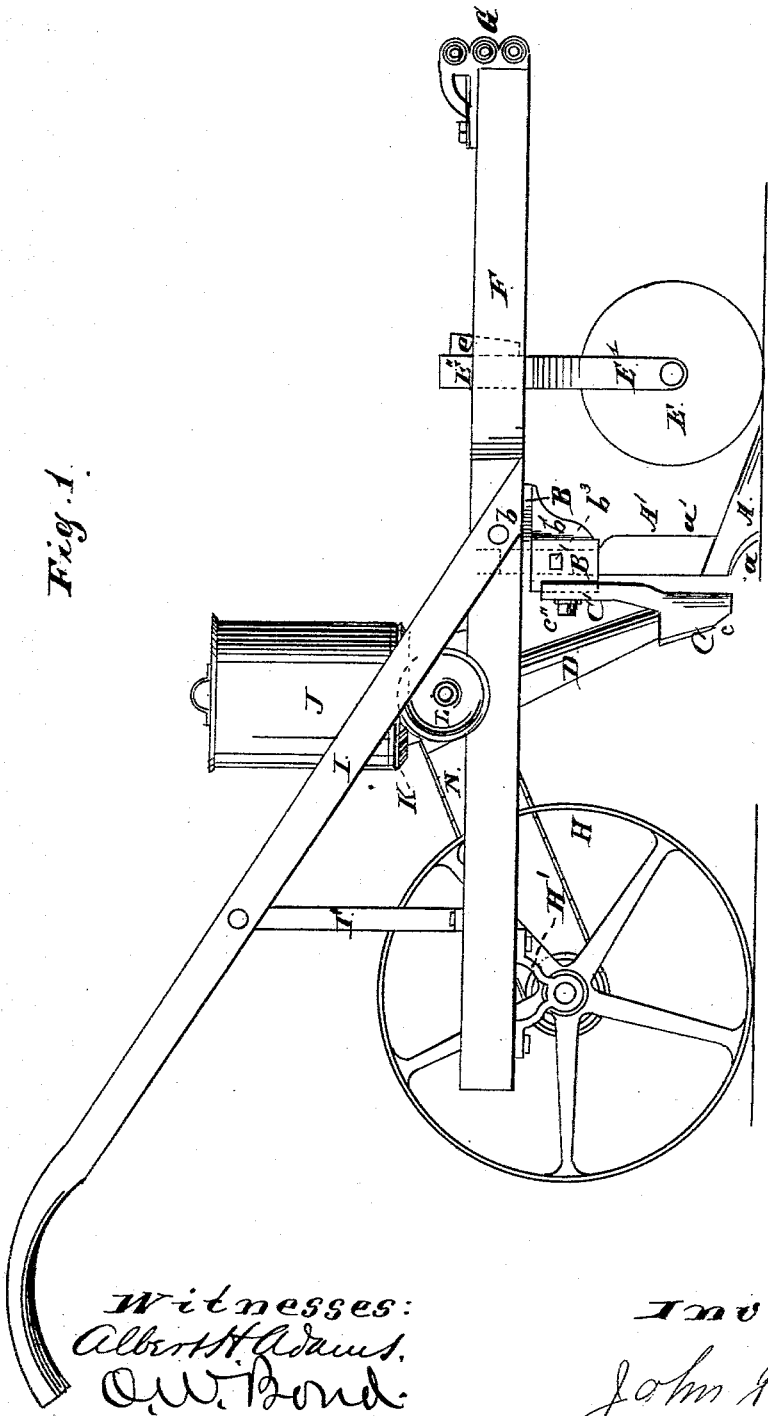

(No Model.)                 3 Sheets—Sheet 1.

J. F. PACKER.
SEEDING MACHINE.

No. 323,444.          Patented Aug. 4, 1885.

Witnesses:
Albert H. Adams
O. W. Bond

Inventor:
John F. Packer

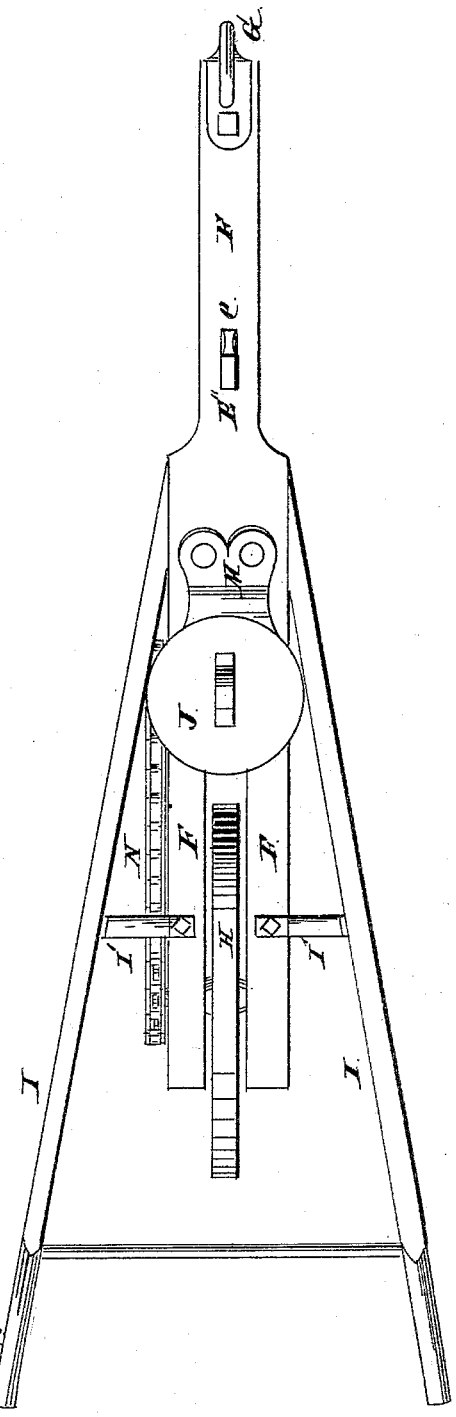

(No Model.) 3 Sheets—Sheet 3.
J. F. PACKER.
SEEDING MACHINE.
No. 323,444. Patented Aug. 4, 1885.
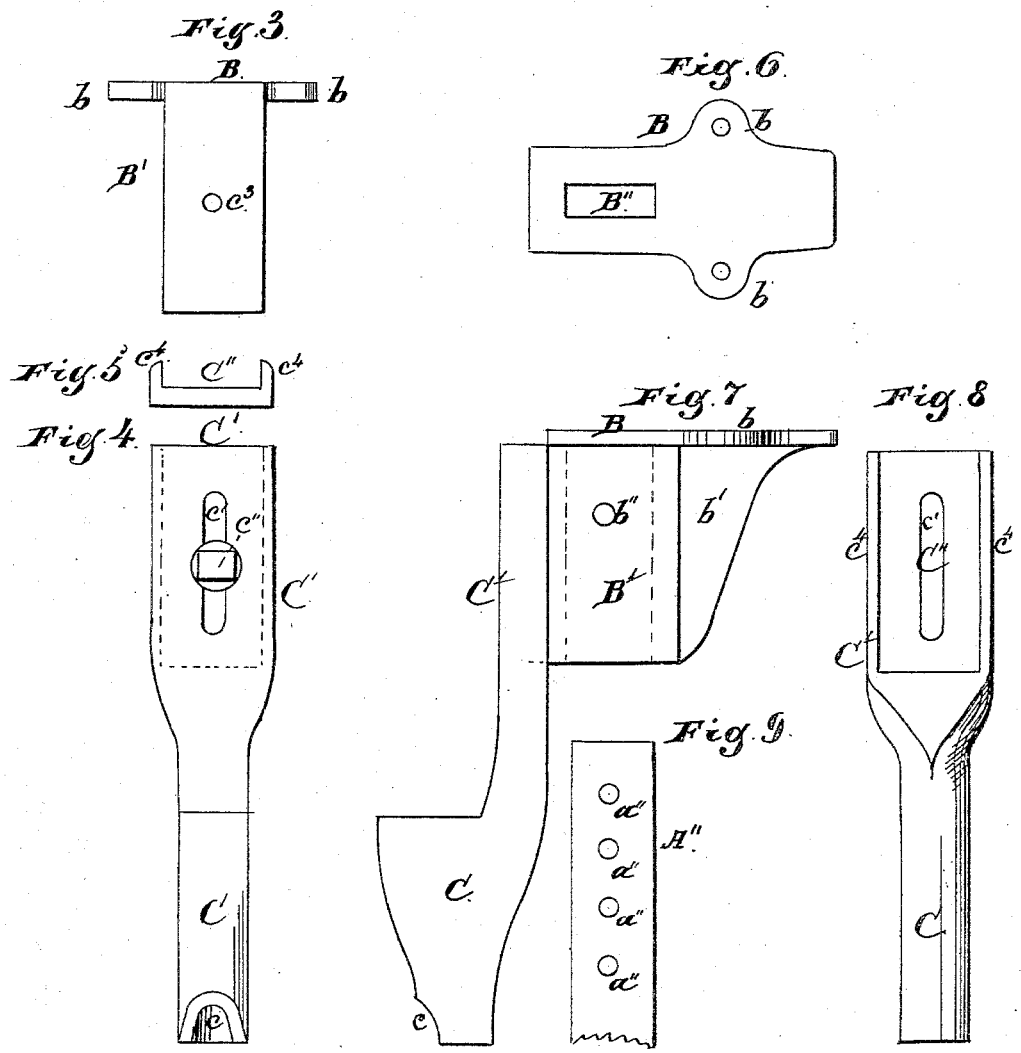

UNITED STATES PATENT OFFICE.

JOHN F. PACKER, OF CHICAGO, ILLINOIS, ASSIGNOR TO DAVID BRADLEY MANUFACTURING COMPANY, OF SAME PLACE.

SEEDING-MACHINE.

SPECIFICATION forming part of Letters Patent No. 323,444, dated August 4, 1885.

Application filed January 23, 1885. (No model.)

*To all whom it may concern:*

Be it known that I, JOHN F. PACKER, residing at Chicago, in the county of Cook and State of Illinois, and a citizen of the United States, have invented a new and useful Improvement in Seeding-Machines, of which the following is a full description, reference being had to the accompanying drawings, in which—

Figure 1 is a side elevation; Fig. 2, a top or plan view; Fig. 3, a detail, being a rear elevation of the support or bracket carrying the subsoiler and the dropping-spout; Fig. 4, a rear elevation of the dropping-spout; Fig. 5, a top view of the dropping-spout with the lower end not shown; Fig. 6, a top view of the support or bracket carrying the subsoiler and dropping-spout; Fig. 7, a side elevation of the bracket with the dropping-spout thereon; Fig. 8, a front elevation of the dropping-spout; Fig. 9, a side elevation of the upper end of the shank of the subsoiler.

This invention is primarily designed for use as a seeding-machine for planting corn; but it can be used for planting other seeds; and it has for its objects to enable the seed to be deposited beneath the surface of the ground at any desired depth without the necessity of throwing the earth back in the line of planting; to leave a furrow in which the seed is deposited, which furrow is covered by the earth as the seed is being dropped, and to prevent obstructions in the path of dropping from interfering with the dropping, and to have the seed as dropped covered by the earth without the use of additional coverers, as has heretofore been necessary; and its nature consists in the several parts and combinations of parts hereinafter described, and pointed out in the claims as new.

In the drawings, A represents the subsoiler, having at its rear or heel end a cut-away portion, $a$, for the earth to drop behind the subsoiler. This subsoiler is attached to a shank, A', the forward edge of which is provided with a sharp edge, $a'$, to act and readily cut and pass through the ground, and extending up from the upper end of the shank A' is a stem, A'', in which is a series of transverse holes, $a''$. The subsoiler A is of such shape as to pass readily through the ground and open the same without throwing the dirt up to an extent to prevent it falling readily back in the track of the subsoiler.

B is a plate depending from which is a socket, B', having an opening, B'', adapted to receive the stem A'' of the shank A', and the stem is secured in the socket in any desired position by passing a bolt, $b^3$, through the transverse hole $b''$ in the socket and that one of the holes $a''$ which will adjust the subsoiler to run at the required depth. The plate B is provided with ears $b$, through which bolts can be passed to secure the plate to the beam of the machine, and, as shown, a strengthening web or flange, $b'$, is provided, running from the forward face of the socket B' to the under face of the plate B.

C is a tube located just back of the rear end or heel of the subsoiler A, which tube is formed with or attached to an arm, C', the front face of which has a recess, C'', formed between flanges $c^4$, to receive the rear face of the socket B, and the attachment of the arm C' to the socket B' is completed by a bolt, $c''$, the stem of which passes through a slot, $c'$, in the arm C', and enters a screw-threaded opening, $c^3$, in the rear wall of the socket B', and by means of the slot $c'$ and bolt $c''$ the spout or tube C can be adjusted higher or lower in relation to the bottom of the furrow cut by the subsoiler, to drop the seed at any point from the bottom of the furrow to or near the surface of the ground.

D is a tube leading from the dropping devices to the spout C, for passing the seed from the dropping devices into the spout, to pass therefrom into the opening made by the subsoiler; and, as shown, to facilitate the dropping the lower rear end of the spout C is cut away to make a larger opening, $c$, for the passage of the seed.

E is a rotary colter mounted in a fork, E', the stem E'' of which passes up through the beam of the machine and is locked in position, as shown, by a wedge, $e$, so that the colter can be adjusted to run higher or lower. This colter is located forward of and in direct line with the point of the subsoiler, and acts to cut any obstruction coming in the path of the subsoiler which would interfere with the operation of the machine.

F is a beam, made of wood or other suitable material, to which the parts composing the machine are attached.

G is a clevis, mounted on the forward end of the beam in any usual and well-known manner, to receive the hitch of the team.

H is a carrying-wheel the axle of which is mounted in brackets H', depending from under face of the beam at the rear end, in the form of construction shown, and, as shown, the rear end of the beam is slotted or forked, and the carrying-wheel is located in such slot or fork.

I are handles, the forward ends of which are bolted or otherwise secured to the sides of the beam, and each handle, as shown, is supported by an upright, I', running up from the top of the beam.

J is a receptacle for the seed, in the bottom of which are located suitable dropping devices, which devices may be of any of the usual and well-known forms of rotary drops, and are therefore not shown.

K is a miter-wheel for rotating the dropping-plate.

L is a miter pinion or wheel for driving the wheel K.

M is a frame or support located on top of the beam F, and carrying the seed-receptacle and dropping mechanism.

N is a chain running over a sprocket-wheel on the shaft of the wheel H, to be driven by the travel of the wheel H, and over a sprocket-wheel on the shaft of the bevel-gear L, to drive such gear and operate the dropping mechanism. The parts represented by the letters F to N, both inclusive, may be of the form of construction and arrangement shown, or of some other form of construction and arrangement, as they constitute no part of the invention, which relates simply to the subsoiler, dropping tube or spout, and the rolling colter by which an opening is made for the seed, and the seed dropped and covered, and obstructions cut.

The operation is as follows: The subsoiler is adjusted for the required running depth by moving the stem up or down in the socket B', and the spout C is adjusted for the desired point at which the seed is to be deposited by moving the arm C' up or down, and the colter is adjusted to run in proper relation to the subsoiler, to cut obstructions in front of the subsoiler, and when the parts are adjusted as may be required the machine is run across the field, operating the dropping mechanism, allowing the seed to pass from the receptacle J into the spout D, to the spout C, thence out into the ground; and as this spout runs below the surface of the ground and back of the subsoiler, it will be seen that the discharge therefrom will enter the opening made by the subsoiler at the rear of the subsoiler and below the surface of the ground, and as the subsoiler does not act to throw the dirt off and away, the corn will be covered by the dirt as the machine is carried forward without the employment of other devices. The subsoiler acts to open the earth sufficiently for the seed to pass from the discharge-spout C, and at the same time the suction of the subsoiler as it moves along tends to draw the seed to a point at the heel of the subsoiler into the space produced by such suction, which suction also draws and holds down the seed dropped.

The devices in use are equally applicable to work in sod, sand, clay, or other soil, and will perform the required work in an effectual and reliable manner, irrespective of the soil and the condition in which it may be, and either the subsoiler or the spout can be adjusted independently, to adjust either one to run at varying depths in relation to the other.

What I claim as new, and desire to secure by Letters Patent, is—

1. The combination, with a subsoiler, of an adjustable dropping tube or spout located and operating at the heel of the subsoiler, for depositing seed below the surface of the ground, substantially as described.

2. The combination, with a subsoiler and an adjustable dropping tube or spout located and operating at the heel of the subsoiler, of an adjustable colter-blade located and operating in front of the subsoiler, substantially as and for the purpose specified.

3. The subsoiler A, having the shank A', with the sharp front cutting-edge, $a'$, in combination with the dropping tube or spout C, located and operating at the heel of the subsoiler, substantially as and for the purpose specified.

4. The combination, with a subsoiler, of a tube, D, leading from dropping devices, and an adjustable spout, C, located and operating at the heel of the subsoiler, substantially as described.

JOHN F. PACKER.

Witnesses:
ALBERT H. ADAMS,
O. W. BOND.